Patented Aug. 10, 1954

2,686,181

UNITED STATES PATENT OFFICE 2,686,181

16,17-OXIDO-5-PREGNENES AND METHOD OF PREPARING

Percy L. Julian, Maywood, and Edwin W. Meyer and Isabelle Ryden, Chicago, Ill., assignors to The Glidden Company, Cleveland, Ohio, a corporation of Ohio No Drawing. Application August 11, 1949, Serial No. 109,808

18 Claims. (Cl. 260—239.55)

The present invention is concerned with the preparation of 16,17-oxido-20-keto-pregnenes.

The preparation of 16,17-oxido-pregnenes is important in that they are valuable compounds for the production of 17α-hydroxy pregnenes by reduction of the oxido-compounds, since many of the cortical hormones are 17α-hydroxy pregnenes. The preparation of 16,17-oxido-pregnanes is known but insofar as we are aware, the preparation of the 16,17-oxido-pregnenes has not been described in the literature.

It is accordingly an object of the present invention to provide a process for preparing 16,17-oxido-20-keto pregnenes.

Another object is to provide new and valuable steroid compounds, namely, 16,17-oxido-20-keto pregnenes.

A further object is to produce 16,17-oxido-20-keto pregnenes from 5,16-pregnadiene-3-ol-20-one.

Other objects will be apparent from the following description.

Conversion of the 16,17 double bond to a 16,17-oxido-ring is readily accomplished with perbenzoic acid. However, in the case of substances such as 5-pregnene-3β-ol-20-one, it has been found necessary to protect the 5-6 double bond during this oxidation. This has been accomplished in two ways.

In spite of the fact that Marker et al., J. A. C. S. 64,2093 (1942) have shown that the 16,17 double bond of 16-pregnene-3β-ol-20-one acetate reacts readily with bromine to form the corresponding 16,17 dibromo derivative, it has been found upon treatment of the 5,16-pregnadienes with equimolecular amounts of bromine that the bromination was preferential in that the bromine entered the 5,6 double bond in preference to the 16,17 double bond, and that the resulting 5,6 dibromo group was resistant to the action of perbenzoic acid.

In the other method, it was found that the 5,6 double bond could be protected by conversion to the 6-alkoxy-i-ether without interference with the reactivity of the 16,17 double bond when treated with perbenzoic acid.

The following examples are illustrative of the invention.

EXAMPLE 1

*Preparation of 16,17-oxido-5-pregnene-3β-ol-20-one acetate*

A solution of 3.54 g. of 5,16-pregnadiene-3β-ol-20-one acetate in 20 ml. of chloroform was treated at ice bath temperature with a solution of 1.60 g. of bromine in 16 ml. of chloroform. The chloroform solution was then washed with water, 2% sodium hydroxide solution, water and dried. It was then concentrated in vacuo to a white crystalline solid. This solid was dissolved in 50 ml. of benzene and treated with 50 ml. of a benzene solution of perbenzoic acid (56 mg./ml.). After standing in the dark at room temperature for twenty-four hours, the benzene solution was washed with 2% sodium hydroxide solution and water. The dried solution was concentrated to a white crystalline solid which was debrominated with zinc dust in ether-acetic acid solution. The ether solution was separated from zinc, washed with water, dilute sodium bicarbonate solution, water and dried. After concentration, the product, 16,17-oxido-5-pregnene-3β-ol-20-one acetate, was crystallized from methanol, 1.66 g., M. P. 152–155°.

EXAMPLE 2

*The preparation of 5,16-pregnadiene-3β-ol-20-one p-tosylate*

A solution of 4.0 g. of 5,16-pregnadiene-3β-ol-20-one and 4.0 g. p-toluenesulfonyl chloride in 15 ml. of pyridine was allowed to stand at room temperature for twenty-four hours. It was taken up in ether-methylene chloride and washed with dilute hydrochloric acid, water, dilute sodium bicarbonate solution and water. The material remaining after removal of solvent was crystallized from acetone, 4.17 g., M. P. 153–163°. Recrystallization from acetone gave fine, white needles of 16-dehydropregnenolone p-tosylate, M. P. 163–164°, dec.

EXAMPLE 3

*The preparation of 16-dehydro-6-methoxy-i-pregnane-20-one*

For protection of the 5-6 double bond, the tosylate of Example 2 was converted to the i-methyl ether. A solution of 2.0 g. of the tosylate in 50 ml. of anhydrous methanol containing 5.0 g. of fused potassium acetate was boiled under reflux for three hours. The mixture was then diluted with water and extracted with ether. The ether solution was washed with water, dilute sodium bicarbonate solution, water and dried. The crude i-ether, 6-methoxy-16-i-pregnene-20-one, remained as a yellow oil. Chromatography of a sample over activated alumina gave material melting at 58–60°, $[\alpha]_D^{26}+87.4°$. The i-ether was further characterized by conversion to the 3-methyl ether upon treatment with methanol containing a few drops of concentrated sulfuric acid. There resulted white needles melting at 163–165°. The same normal ether can be obtained from the tosylate by reaction with methanol.

EXAMPLE 4

*The preparation of 16,17-oxido-5-pregnene-3β-ol-20-one*

6-methoxy-16-i-pregnene-20-one, 1.6 g., was treated with 20 ml. of a benzene solution of perbenzoic acid, 78 mg./ml. After standing for 24 hours in the dark, the solution was diluted with ether, washed with 5% sodium hydroxide solution followed by water until neutral. The dried solution was concentrated in vacuo to 1.63 g. of light yellow sirup. This oxido i-ether was dissolved in 30 ml. of dioxane to which 5 ml. of water containing one drop of concentrated sulfuric acid was added. After refluxing for one hour, the reaction mixture was poured into 300 ml. of water, chilled and the crystalline solid separated. The product, crude 16,17-oxido-5-pregnene-3β-ol-20-one, weighed 1.10 g. and melted at 170–180°, with softening at 120°. After several recrystallizations from ether-petroleum ether and from acetone, the material melted at 189–190°. The same product was obtained from the methanolic potassium hydroxide hydrolysis of the acetate of Example 1.

Likewise, the normal ether of the oxido compound may be formed by treatment of the oxido-i-ether with methanol containing a few drops of sulfuric acid.

EXAMPLE 5

*The preparation of 16,17-oxido-progesterone*

500 mg. of the hydroxy oxide of Example 4 was dissolved in 35 ml. of toluene and 5 ml. of freshly-distilled cyclohexanone. A few ml. of the solvent were removed by distillation to eliminate traces of water. After the addition of another 10 ml. of toluene, 250 mg. of aluminum isopropoxide in 2.5 ml. of toluene was added dropwise to the refluxing solution. After one-half hour of refluxing, the mixture was decomposed with several drops of glacial acetic acid in 1 ml. of toluene. The mixture was then steam distilled. Four grams of sodium chloride was added and after chilling, the fine crystalline solid was separated. Crystallization of this material from ether-petroleum ether gave 330 mg. of product melting at 195–205°. Purification by recrystallization from aqueous methanol gave pure 16,17-oxido-4-pregnene-3,20-dione, M. P. 205–207°; $[\alpha]_D^{27}+160.8°$.

EXAMPLE 6

*Preparation of 16,17-oxido-5-pregnene-3β-ol-20-one*

In much the same fashion as described in Example 1, 5,16-pregnadiene-3β-ol-20-one was treated with one molar equivalent of bromine and then submitted to the action of perbenzoic acid in benzene solution. After debromination of the product with zinc dust in ether-acetic acid, there was isolated 16,17-oxido-5-pregnene-3β-ol-20-one which after recrystallization from ether-petroleum ether and from acetone melted at 189–190° C.

The foregoing examples are illustrative only and variations therefrom may be made without departing from the invention. Thus, the method for forming the i-ethers may be varied as is well known in the art. Also other esters than the acetate, such as the benzoate, and also other 3-oxygenated derivatives such as the 3-alkoxy derivatives, may be employed for the bromination treatment. Also compounds containing oxygenated groups at other positions in the molecule, such as the 11 and 12 hydroxy and keto steroids, may be treated in the same manner as the particular compounds mentioned in the examples.

Having described the invention, what is claimed is:

1. The process of preparing 16,17-oxido-pregnenes which comprises treating a 5,16-pregnadiene having a keto group in the 20-position and an oxygen-containing group attached to the 3-carbon atom through a single carbon-oxygen bond selected from the class consisting of a hydroxy group and acyloxy groups of hydrocarbon carboxylic acids containing not more than seven carbon atoms with an equimolecular quantity of bromine, to brominate the 5-6 double bond, treating the brominated compound with perbenzoic acid, and thereafter removing bromine.

2. The process of claim 1 in which the group in the 3-position is an acyloxy group.

3. The process of claim 1 in which the group in the 3-position is an acetoxy group.

4. The process of preparing a 16,17-oxido-pregnene from a 5,16-pregnadiene-3-ol-20-one which comprises preferentially protecting the double bond involving the number 5 carbon atom against the action of perbenzoic acid, treating the thus protected compound with perbenzoic acid, and then restoring the double bond involving the number 5 carbon atom.

5. The process of preparing a 16,17-oxido-pregnene which comprises preferentially protecting the double bond involving the number 5 carbon atom of a 3-acyloxy-5,16-pregnadiene-20-one said acyloxy group being the acyloxy group of an hydrocarbon carboxylic acid having not more than 7 carbon atoms against the action of perbenzoic acid, treating the thus protected compound with perbenzoic acid, and then restoring the double bond involving the number 5 carbon atom.

6. The process which comprises treating 5,16-pregnadiene-3β-ol-20-one acetate with an equimolecular quantity of bromine to brominate the 5-6 double bond, treating the resulting dibromo compound with perbenzoic acid, and thereafter removing bromine.

7. The process of preparing 16,17-oxido pregnenes which comprises converting a 5,16-pregnadiene-3-ol-20-one into a 6-alkoxy-16-i-pregnene-20-one, treating the i-ether with perbenzoic acid to form a 16,17-oxido-i-ether, and then converting the i-ether into a 16,17-oxido-5-pregnene-3-ol-20-one.

8. The process of claim 7 in which the alkoxy group is the methoxy group.

9. 16,17-oxido-pregnene-20-ones having a substituent attached at the 3-position through oxygen selected from the class consisting of a hydroxy group and acyloxy groups of hydrocarbon carboxylic acids containing not more than seven carbon atoms, and a double bond involving the number 5 carbon atom.

10. 16,17-oxido-5-pregnene-20-ones having an oxygenated function attached at the 3-position selected from the class consisting of a hydroxy group and acyloxy groups of hydrocarbon carboxylic acids containing not more than seven carbon atoms.

11. 16,17-oxido-5-pregnene-20-ones having a hydroxy group at the 3-position.

12. 16,17-oxido-5-pregnene-3β-ol-20-one.

13. 16,17-oxido-5-pregnene-20-ones having an acyloxy group of an hydrocarbon carboxylic acid containing not more than 7 carbon atoms at the 3-position.

14. 3 - acyloxy derivatives of 16,17 - oxido - 5-pregnene-3β-ol-20-one in which the acyloxy group is the acyloxy group of an hydrocarbon carboxylic acid containing not more than 7 carbon atoms.

15. The compounds of claim 13 in which the ester group at the 3-position is an acetate group.

16. 16,17-oxido-5-pregnene-3β-ol-20-one acetate.

17. 16,17-oxido-progesterone.

18. 16,17-oxido-pregnene-20-ones in which the double bond involves the number 5 carbon atom and which possess an oxygen-containing substituent attached only to the carbon atom in the 3-position through the oxygen thereof, said substituent having a molecular weight less than 18.

References Cited in the file of this patent

UNITED STATES PATENTS

| Number | Name | Date |
|---|---|---|
| 2,256,500 | Serini et al. | Sept. 23, 1941 |
| 2,265,143 | Butenandt et al. | Dec. 9, 1941 |
| 2,312,344 | Logemann | Mar. 2, 1943 |
| 2,321,690 | Logemann | June 15, 1943 |

FOREIGN PATENTS

| Number | Country | Date |
|---|---|---|
| 50,747 | Netherlands | Aug. 15, 1941 |
| 51,378 | Netherlands | Nov. 15, 1941 |
| 561,566 | Great Britain | May 24, 1944 |
| 839,070 | France | Dec. 26, 1938 |

OTHER REFERENCES

Henbest et al.: Nature, vol. 158 (1946), p. 950.